United States Patent
Bourgeois

[11] Patent Number: 5,180,489
[45] Date of Patent: Jan. 19, 1993

[54] FILTER CARTRIDGE HAVING INTERNAL LIQUID TRAP

[76] Inventor: Edmund B. Bourgeois, 29354 Merrick, Warren, Mich. 48092

[21] Appl. No.: 754,564

[22] Filed: Sep. 4, 1991

[51] Int. Cl.$^5$ .............................. B01D 29/15
[52] U.S. Cl. ............................. 210/238; 210/172; 210/309; 210/439; 210/457; 210/461; 210/462; 210/484; 210/493.2
[58] Field of Search ............ 210/238, 299, 308, 309, 210/315, 438, 439, 461, 462, 484, 493.1, 493.2, 493.5, 457, 172

[56] References Cited

U.S. PATENT DOCUMENTS

| | | | |
|---|---|---|---|
| 2,468,862 | 5/1949 | Briggs | 210/457 |
| 3,246,765 | 4/1966 | Murphy et al. | 210/484 |
| 3,397,793 | 8/1968 | MacDonnell | 210/484 |
| 4,878,930 | 11/1989 | Manniso | 210/493.2 |
| 5,085,769 | 2/1992 | Klausen | 210/309 |

FOREIGN PATENT DOCUMENTS

| | | | |
|---|---|---|---|
| 486082 | 10/1953 | Italy | 210/438 |
| 549083 | 2/1956 | Italy | 210/439 |

Primary Examiner—Robert A. Dawson
Assistant Examiner—Matthew O. Savage
Attorney, Agent, or Firm—Reising, Ethington, Barnard, Perry & Milton

[57] ABSTRACT

A filter cartridge (10) for filtering liquid having an internal liquid trap (28). The cartridge (10) has a cylindrical housing (12) having a closed top end (14) and bottom end (16), and a side wall (30) which is perforated to allow liquid to pass through. A tube (22) extends from a liquid inlet (18) at the bottom end (16) of the housing toward the top end (14), where the tube (22) is open to allow the liquid to flow into the housing (12). The cartridge (10) includes a filter media (26) inside the housing spaced apart from the conduit (22) so that the filter media (26), the bottom end (16) and the length of the conduit (22) below where the conduit is open form a trap (28). This trap catches liquid flowing into the housing (12) through the conduit (22) whereby the liquid may escape the cartridge (10) only through the filter media (26) thereby preventing back flow through the conduit (22).

15 Claims, 2 Drawing Sheets

FILTER CARTRIDGE HAVING INTERNAL LIQUID TRAP

TECHNICAL FIELD

The subject invention relates to filter cartridges of the type for filtering liquid passing radially away from the center of the filter cartridge through a filter media.

BACKGROUND ART

In particular liquid filtering arts it is necessary to prevent dirty liquid in a filter cartridge from passing out of the filter cartridge and into the immediate area around the filter, i.e., the filter housing when the filter is withdrawn. This is true in the situation where liquid is pumped through the cartridge, becomes clean or filtered, and drops into a tank or trough below the cartridge. When the cartridge needs to be replaced and dirty liquid remains in the cartridge after pump shutoff, such liquid must remain in the cartridge. Otherwise, the dirty liquid can leak out and contaminate the clean liquid in the tank.

The process of wire electro discharge machining (wire EDM) uses a filtration system as described above. A wire EDM system basically cuts a part by emitting electronic charges which erode the surface of the part being machined.

A non-conducting liquid is used to flush and cool the part while the part is being cut with the wire EDM system. Since the liquid is in a closed system, i.e. the liquid is reused, the liquid must be filtered to remove the particles it flushed away from the part being machined. Otherwise the particles may clog the machine or render the non-conducting liquid a conducting liquid. The filter cartridge for filtering such liquid generally requires replacing about once every 100 to 150 hours of process time.

The current filter cartridge has a perforated cylindrical housing, a central tube for conducting liquid into the housing from the bottom of the housing, and a filter media disposed between the tube and the housing. In operation, liquid is pumped through the tube into the housing. The liquid passes through perforation all along the length of the tube into the housing. It passes then through the filter media and out through the perforation in the housing, where it falls into a tank before being recirculated. Unfortunately, when the filter cartridge is removed, any residual liquid in the filter can pass back through the holes in the central tube and out the cartridge—and into the tank with the clean liquid. This requires that the tank be cleaned after each time the filter cartridge is replaced.

A filter cartridge disclosed in the U.S. Pat. No. 1,805,450 to Harvey has a central tube which is open only at the top. This helps trap dirty liquid in the filter and prevent such liquid from leaving the filter except through the filter media as clean liquid. Unfortunately, the Harvey filter has filter media contiguous with or abutting the central tube. In other words, there is no space between the tube and the filter media in which the liquid may collect before passing through the filter media. The liquid becomes filtered as soon as it leaves the tube. This arrangement causes the filter media closest to the opening on the tube to become used up, even clogged, before other areas of the filter media. This is not an efficient use of the filter media.

SUMMARY OF THE INVENTION AND ADVANTAGES

A filter cartridge assembly for filtering liquid comprises a housing having a top end, a bottom end, a liquid inlet disposed at the bottom end and a liquid outlet. The assembly also includes a liquid conducting conduit in fluid communication with the inlet and extending upwardly from the inlet toward an open end adjacent the top end of the housing for conducting liquid into the housing. A filter media is disposed between the inlet and the outlet, the filter media being spaced apart from the conduit to define a space between the conduit and the filter media. The assembly is characterized by the conduit below the open end, the filter media and the bottom end defining a trap for trapping liquid flowing into the housing so that the liquid may escape the housing through the outlet by passing only through the filter media and is prevented from backflow through the conduit.

Since the liquid can only escape the liquid as clean, filtered liquid, the tank in which the filter operates will not be contaminated each time the filter cartridge is replaced.

Since the filter is spaced apart from the conduit, more surface area of the filter is exposed to the dirty water at any given time. Also, particles in the liquid can settle to the bottom of the trap without clogging the filter media. This allows more efficient use of the filter.

FIGURES IN THE DRAWINGS

Other advantages of the present invention will be readily appreciated as the same becomes better understood by reference to the following detailed description when considered in conjunction with the accompanying drawings wherein.

DETAILED DESCRIPTION OF THE PREFERRED EMBODIMENT

Figure 1:
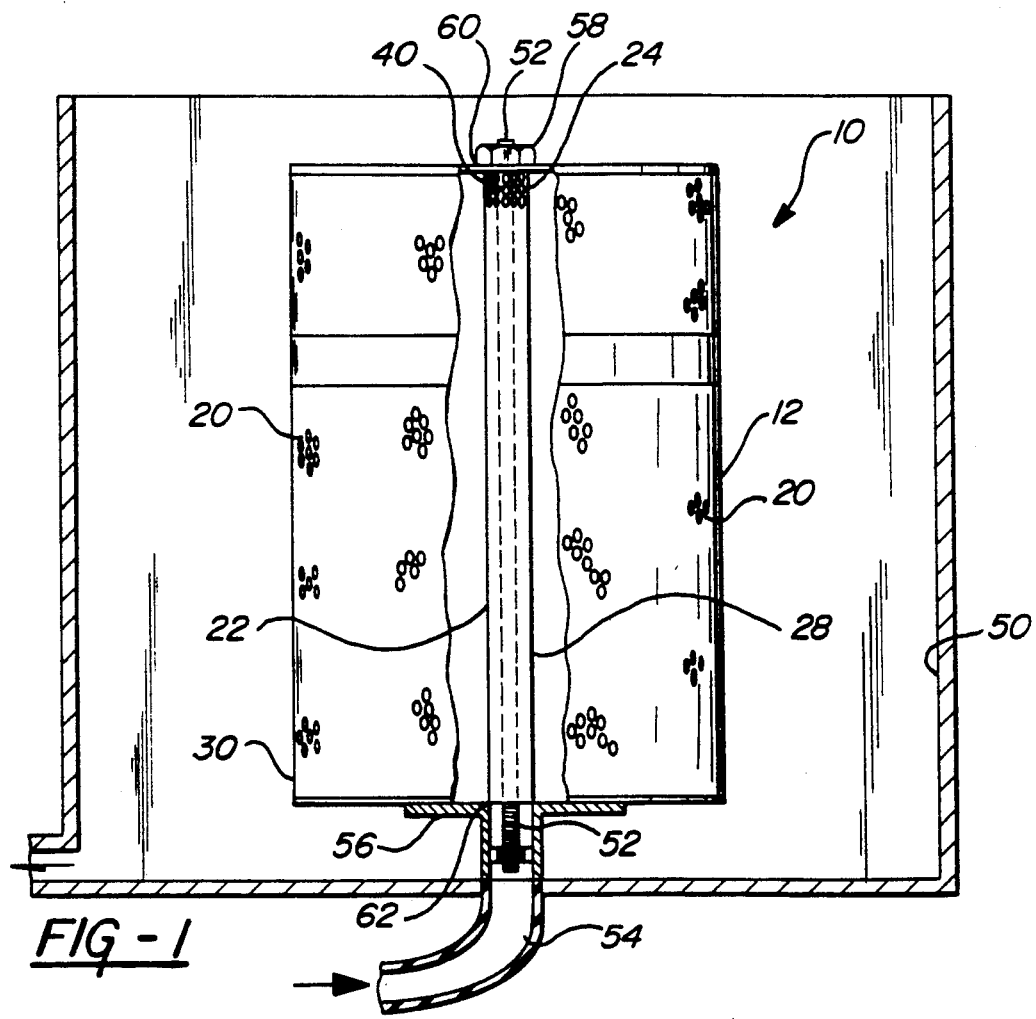
FIG. 1 is a cross-sectional side view of the filter cartridge partially cut away and disposed in the filter tank.
Figure 3:
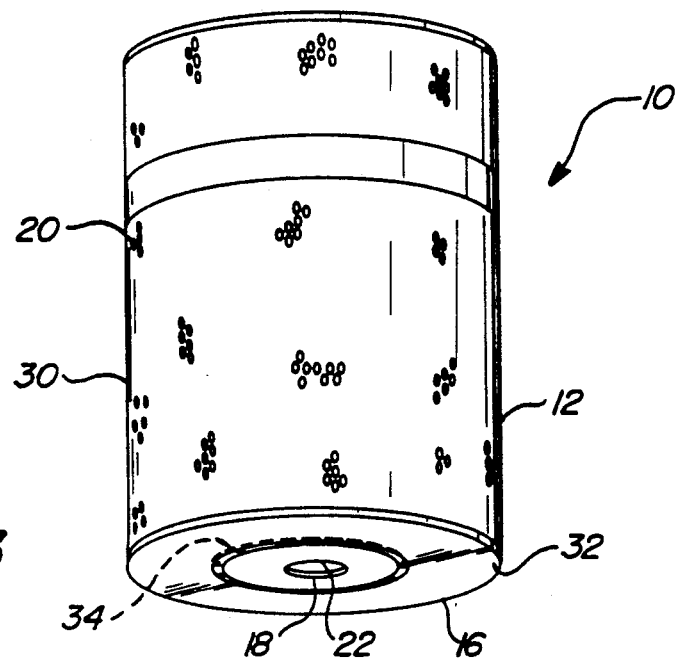
FIG. 3 is a perspective view of the filter showing the bottom end.
Figure 2:
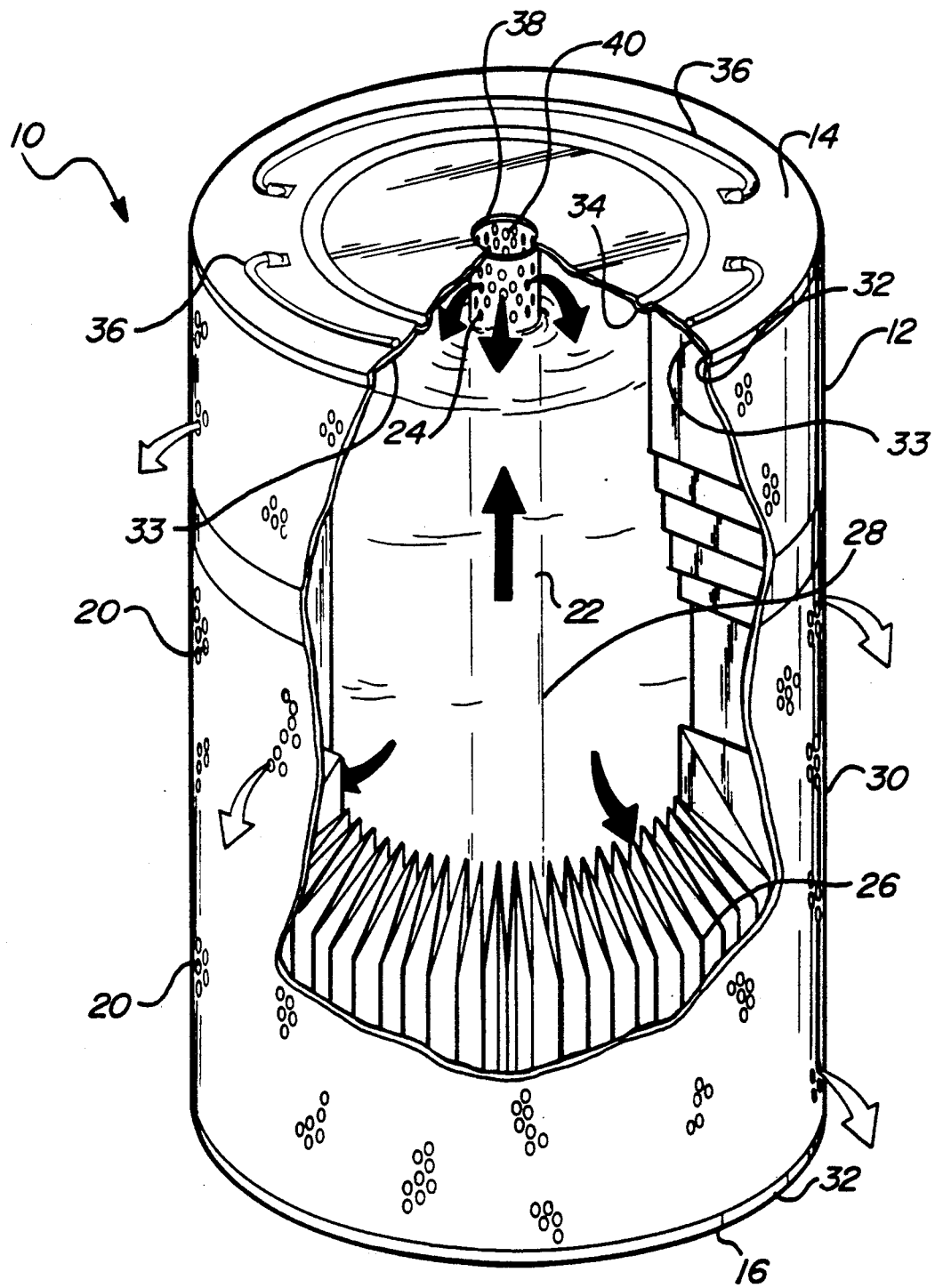
FIG. 2 is a perspective view of the cartridge partially cut away showing the top end.

We disclose a filter cartridge assembly 10 for filtering liquid comprising: a housing 12 having a top end 14, a bottom end 16, a liquid inlet 18 disposed at the bottom end 16 and a liquid outlet 20; a liquid conducting conduit 22 in fluid communication with the inlet 18 and extending upwardly from the inlet toward an open end 24 adjacent the top end 14 of the housing 12 for conducting liquid into the housing. The filter cartridge 10 further comprises a filter media 26 disposed between the inlet 18 and the outlet 20, with the filter media 26 being spaced apart from the conduit 22 to define a space between the conduit 22 and the filter media 26. The filter cartridge 10 is characterized by the conduit 22 below its open end 24, the filter media 26 and the bottom end 16 defining a trap 28 for trapping liquid flowing into the housing 12 so that the liquid may escape the housing through the outlet 20 by passing only through the filter media 26, thereby preventing backflow through the conduit 22.

The housing 12 includes a cylindrical outer wall 30 extending between the top and bottom ends, with perforations or holes 20 being disposed in the cylindrical outer wall 30. These perforations or holes 20 define the outlet 20. The cylindrical wall 30 is made from sheet metal. The holes 20 are punched in the metal and then the sheet is rolled into a cylindrical shape. Next, the metal is coated with an electrostatic powder dry coating to prevent corrosion of the housing 12 which could contaminate the clean filtered liquid in the tank 50 below and surrounding the filter cartridge 10.

The top and bottom ends are end caps 14,16 made from galvanized steel—also to prevent corrosion. Each end cap has a circular periphery with an annular flange 32 disposed thereon and extending toward the inside of the cartridge 10. Each end cap also includes a circular ridge 34 disposed between the annular flange 32 and the center of the end cap and extending toward the inside of the cartridge 10. The annular ridge 34 and the annular flange 32 define an annular trough in which the filter media 26 is disposed. The top and bottom end caps 14, 16 are epoxied or otherwise secured to the cylindrical wall. Handles 36 are fixedly attached to the top end cap 14 for allowing a person to easily grip the filter cartridge 10 when removing it.

The top end cap 14 includes a top hole 38 in communication with the conduit 22 so that the inlet 18, the conduit and the top hole 38 define a continuous path. This hole 38 exists to allow the cartridge 10 to be mounted on a steel rod 52 which extends upwardly from a filter mounting pedestal 56 in the tank 50. The rod 52 extends up and through the cartridge 10 when the cartridge rests on the pedestal 56. Aside from the inlet 18 hole through the bottom end cap 16, and the top hole 38 through the top end cap 14, the top and bottom end caps 14,16 must be solid, unbroken, and watertight so that no liquid can escape the filter cartridge 10 except through the filter media 26—as clean liquid.

The conduit 22 is supported by the bottom end cap 16 and the top end cap 14 of the housing 12. In other words, the conduit 22 extends completely through the filter cartridge 10. This is not necessary to the functioning of the invention: the conduit 22 could extend up to, but just short of the top end cap 14. In this case there would be no holes 40 through the top of the conduit 22; the conduit would merely be open. However, this arrangement would lack the desirable flow control characteristics disclosed below. Also, the cartridge 10 will be sturdier if the conduit 22 extends all the way through the cartridge 10 from bottom 16 to top 14. The conduit 22 is a cylindrical tube made from galvanized steel to prevent corrosion. It is epoxied or otherwise secured to the top and bottom end caps 14,16.

A minor portion of the tube 22 includes a plurality of circular holes 40 adjacent the top end cap 14 for allowing liquid to flow into the body, with the tube 22 being closed between the holes 40 and the inlet 18 at the bottom. In the preferred embodiment, the tube 22 includes two rows of ¼" holes having 4 holes in each row, spaced 45 degrees apart. The rows are staggered from one another so that the holes in one row are 45 degrees apart from holes in the other row. These rows are disposed immediately adjacent the top end cap 14 of the housing 12. A major portion of the tube below these holes 40 the tube 22 must be solid, unbroken or watertight. This part of the tube 22 must form a trap 28 with the bottom end cap 16 and with the filter. No liquid should be able to escape through the tube 22 below the level of the above mentioned holes 40.

Since the liquid is pumped through the filter with a centrifugal pump, the outlet holes 40 can determine the flow rate of liquid out of the tube 22. This is true when (as in the present case) the combined open or flow area of the holes 40 is less than the cross sectional open or flow area of the tube 22. In other words, the opening defined collectively by the holes 40 is smaller than the opening defined by the inner diameter of the tube 22. The size and number of the holes 40 in the present case was chosen to match the desired output of the filter cartridge 10. In other words, if the cartridge 10 needs to conduct liquid at the rate of ten gallons per minute, the holes 40 in the conduit 22 must allow liquid to pass at this same rate—even if the tube 22 itself could conduct fluid at a greater rate. In the preferred embodiment, the holes 40 have a smaller open area than the cross-sectional open or flow area of the tube 22 in order to define an orifice. This arrangement in effect controls the flow of liquid into the filter trap 28 at a flow rate less than the flow rate allowed by using more holes, by using larger holes or by simply having the tube 22 be open at one end. It should be noted that the same flow control could be effected by another arrangement or number of holes which have the same combined open area as the combination disclosed hereinabove.

The filter media 26 is a pleated, fibrous filter formed to have a generally cylindrical shape, the inner surface of which is spaced from the tube 22 to define the annular space of the trap 28. The filter media used is preferably the nominal 3 micron type having no surfactants which could introduce foam into the liquid being filtered. The filter media 26 is secured to the bottom end cap 16 by disposing a pool of epoxy perhaps one quarter inch deep in the annular trough 33 defined by the ridge 34 and the flange 32. The cylindrical filter media 26 is then placed in the epoxy and allowed to dry. The process is repeated for securing the filter media 26 to the top end cap 14. The epoxy should form a seal between the filter media 26 and the end caps 14,16 so that liquid cannot pass between the filter media 26 and each of the respective end caps 14,16. The filter media 26 must be spaced apart from the conduit 22 so that there is a void or space therebetween for containing the liquid which flows in through the holes 40 on the tube 22. The filter media 26 is cylindrical and defines a hollow cylindrical space, the center of which should be coincidental with the center of the conduit 22. Thus, the space defined by the filter media 26 and the tube 22 is an annular one.

In operation, the filter cartridge 10 is secured to the filtering tank 50 of the Wire EDM machine by placing the cartridge over a threaded rod 52 which extends upwardly from a dirty liquid supply tube 54 which passes through a pedestal 56. The rod 52 extends up through the conduit 22 and out the top hole 38. A washer 60 and a nut 58 is disposed on the rod 52 above the top end cap 14, and the nut 58 is threaded down the rod until the filter cartridge 10 is securely mounted on the pedestal 56. The pedestal 56 elevates the filter cartridge 10 above the bottom of a clean liquid tank 50. The washer 60 fits over the top hole 38 and insures that no liquid can escape from the conduit 22 through the top hole 38. The inlet 18 in the bottom end cap 16 should align tightly with the outlet 62 of the dirty liquid supply tube 54 so that the dirty liquid can flow from the supply tube 54 into the conduit 22 in the filter cartridge 10 without any dirty liquid leaking out. A centrifugal pump pumps the dirty liquid through the supply tube 54 and up the conduit 22. The liquid leaves the conduit 22 through the eight holes 40 at the top of the conduit and empties into the space between the conduit 22 and the filter media 26, where it is trapped. The flow of liquid into the trap 28 is reduced by the relatively small size of the holes 40. The liquid may pass through the filter media 26, then through the holes 20 in the cylindrical housing 12 and finally out into the clean liquid tank 50 in which the filter sits. When the filter needs replacing the pump is shut off. Liquid in the conduit 22 falls back down to a level equal to that level in the dirty liquid tank, which is adjacent the clean liquid tank 50. The dirty liquid in the filter cartridge 10 remains in the trap 28 in the filter cartridge—unless it escapes as clean liquid through the filter. Thus, when the cartridge 10 is lifted out of the tank 50, only trace amounts of dirty liquid escape into the clean tank 50.

The reduction in the number of holes 40 on the conduit 22 has another advantage for the filter user. The smaller number of holes 40 still meets the machine's requirement for flow rate of liquid through the filter cartridge 10. The larger number of holes provided much more water than was necessary. Since water flows through the filter at a slower rate, the filter life is extended, requiring replacement less often. This low flow rate also allows particles to settle out by gravity into the bottom of the trap 28 of the cartridge 10.

The invention has been described in an illustrative manner, and it is to be understood that the terminology which has been used is intended to be in the nature of words of description rather than words of limitation.

Obviously, many modifications and variations are possible in light of the above teachings. It is therefore to be understood that within the scope of the appended claims wherein reference numerals are merely for convenience and are not to be in any way limiting, the invention may be practiced otherwise than as specifically described.

What is claimed:

1. A filter cartridge assembly for filtering liquid comprising:
   a housing having a top end, a bottom end, a sidewall fixedly attached to said top and bottom ends, a liquid inlet at said bottom end, and a plurality of perforations in said sidewall to form a liquid outlet;
   a liquid conducting conduit in fluid communication with said inlet, one end of said conduit being fixedly attached to and in sealed engagement with said bottom end about said inlet;
   said conduit extending upwardly from said inlet to said top end of the housing and being fixedly attached to said top end of said housing;
   a minor portion of said conduit including a plurality of holes adjacent said top end for allowing liquid to flow into said cartridge, a major portion of said conduit being imperforate and extending continuously between said minor portion and said inlet at said bottom end to force all liquid entering said inlet to exit said plurality of holes;
   a tubular filter media defining radially inner and outer surfaces extending continuously and supported between said top and bottom ends, said filter media being surrounded by said sidewall and spaced apart from and around said conduit to define a space between said conduit in said filter media, said filter media having pores extending from said radially inner surface to said radially outer surface to permit flow radially outwardly from said conduit to said outlet;
   said major portion of said conduit below said plurality of holes, said filter media and said bottom end together defining a trap for trapping liquid and particles flowing into said housing whereby contaminated liquid flows into said filter cartridge through said inlet at said bottom end, flows up said conduit, passes through said plurality of holes, collects in said trap between said conduit and said filter media and flows radially outwardly through said filter media from said interior surface to said exterior surface and out of said housing.

2. An assembly as set forth in claim 1 further defined by said conduit having a cross sectional open area and said holes having a combined open area smaller than said cross sectional open area of said conduit for defining an orifice to restrict liquid flow into said trap.

3. An assembly as set forth in claim 2 further defined by said top end including a top hole in communication with said conduit so that said inlet, said conduit and said top hole define a continuous path.

4. An assembly as set forth in claim 3 further defined by said filter media being a pleated filter having a generally cylindrical shape, said filter extending continuously between said top and said bottom ends to define a continuous wall of filtration material between said top and said bottom ends.

5. An assembly as set forth in claim 4 further defined by said housing having an anti-corrosion coating.

6. An assembly as set forth in claim 5 further defined by said top end and said bottom end each being substantially in the shape of a disk and being made from galvanized steel.

7. An assembly as set forth in claim 6 further defined by said conduit being a cylindrical tube made from galvanized steel.

8. An assembly as set forth in claim 7 further defined by including handles hingedly fixed to said top end.

9. An assembly (10) as set forth in claim 8 wherein said sidewall is cylindrical.

10. An assembly as set forth in claim 9 further defined by including an epoxy between said top end and said outer wall and between said bottom end and said outer wall for sealingly securing said top and bottom ends to said outer wall.

11. An assembly as set forth in claim 10 further defined by said conduit, said sidewall and said filter media being concentric.

12. An assembly as set forth in claim 11 further defined by including an epoxy between said filter media and each of said top and bottom ends of said housing to sealingly secure said filter media to said top and bottom ends of said housing.

13. An assembly as set forth in claim 12 further defined by including an epoxy between said conduit and said top and bottom ends for sealingly securing said conduit to said top and bottom ends of said housing.

14. An assembly as set forth in claim 13 further defined by said conduit including two rows of holes, each of said rows including four holes each.

15. A filter cartridge assembly for filtering liquid comprising:
   a housing having a top end, a bottom end, a liquid inlet disposed at said bottom end, and a liquid outlet;
   said top and bottom ends each being substantially in the shape of a disk;
   said housing having a cylindrical outer wall extending between said top and bottom ends and including perforations defining said outlet;
   a liquid conducting conduit in fluid communication with said inlet, one end of said conduit being fixedly attached to and in sealed engagement with said bottom end about said inlet;

said conduit extending upwardly from said inlet to said top end of said housing and being fixedly attached to said top end of said housing;

said top end including a top hole in communication with said conduit so that said inlet, said conduit and said top hole define a continuous path;

a minor portion of said conduit including a plurality of holes adjacent said top end for allowing liquid to flow into said cartridge, a major portion of said conduit being imperforate and extending continuously between said minor portion and said inlet at said bottom end to force all liquid entering at said bottom end to exit said plurality of holes;

a pleated filter having a generally cylindrical shape, said filter being fixedly attached to and extending continuously between said top and bottom ends and located between said cylindrical outer wall and said conduit to define a continuous wall of filtration material between said top and bottom ends;

said assembly including an epoxy between said top end and said outer wall and between said bottom end and said outer wall for sealingly securing said top and bottom ends of said outer wall;

the major portion of said conduit below said plurality of holes, said filter media and said bottom end together defining a trap for trapping liquid and particles flowing into said housing whereby contaminated liquid flows into said filter cartridge through said inlet and said bottom, flows up said conduit, passes through said plurality of holes, flows through said filter media and out of said housing so that none of the dirty liquid entering said filter cartridge through said plurality of holes may escape said cartridge without passing through said filter media and thus becoming filtered.

* * * * *